United States Patent
Grobelny et al.

(10) Patent No.: US 12,074,980 B2
(45) Date of Patent: Aug. 27, 2024

(54) SYSTEM AND METHOD OF AUTHENTICATING UPDATED FIRMWARE OF AN INFORMATION HANDLING SYSTEM

(71) Applicant: Dell Products L.P., Round Rock, TX (US)

(72) Inventors: Nicholas DiCiurcio Grobelny, Austin, TX (US); Amy Christine Nelson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 314 days.

(21) Appl. No.: 17/351,424

(22) Filed: Jun. 18, 2021

(65) Prior Publication Data
US 2022/0407714 A1    Dec. 22, 2022

(51) Int. Cl.
*H04L 9/32*    (2006.01)
*G06F 8/71*    (2018.01)
*H04L 9/00*    (2022.01)

(52) U.S. Cl.
CPC ............ *H04L 9/3236* (2013.01); *G06F 8/71* (2013.01); *H04L 9/3247* (2013.01); *H04L 9/50* (2022.05)

(58) Field of Classification Search
CPC ....... H04L 9/3236; H04L 9/3247; H04L 9/50; H04L 2209/26; H04L 2209/68;
(Continued)

(56) References Cited

U.S. PATENT DOCUMENTS

| 2006/0143600 A1* | 6/2006 | Cottrell ................ G06F 21/572 717/168 |
| 2008/0313627 A1* | 12/2008 | Segawa ................ G06F 21/602 713/176 |

(Continued)

FOREIGN PATENT DOCUMENTS

CN    112150130    * 12/2020

OTHER PUBLICATIONS

Witanto et al., "Blockchain-based OCF Firmware Update", Oct. 2019, International Conference on Information and Communication Technology Convergence, pp. 1248-1253 (Year: 2019).*

(Continued)

*Primary Examiner* — Kenneth W Chang
(74) *Attorney, Agent, or Firm* — McDermott Will & Emery LLP

(57) ABSTRACT

In one or more embodiments, a first information handling system may: receive a chained cryptographic hash value determined by a trusted platform module (TPM) of a second information handling system; receive multiple patch identities associated with multiple updated firmware installed on multiple components of the second information handling system; receive an event log associated with output of the TPM as the TPM determined the chained cryptographic hash value; retrieve multiple layered endorsements respectively associated with the multiple patch identities; determine multiple hash values from multiple signatures stored in the multiple layered endorsements; compare the chained cryptographic hash value with the event log; compare multiple event information with the multiple hash values; and determine that the second information handling system has booted into a trusted state based at least on comparing the chained cryptographic hash value with the event log and (Continued)

comparing the multiple event information with the multiple hash values.

18 Claims, 10 Drawing Sheets

(58) Field of Classification Search
CPC ....... H04L 9/0897; G06F 8/71; G06F 21/572; G06F 21/575
See application file for complete search history.

(56) References Cited

U.S. PATENT DOCUMENTS

| | | | | |
|---|---|---|---|---|
| 2009/0172639 A1* | 7/2009 | Natu | ........................ | G06F 21/57 717/120 |
| 2011/0010543 A1* | 1/2011 | Schmidt | ................ | H04W 12/06 713/168 |
| 2011/0099627 A1* | 4/2011 | Proudler | ................. | G06F 21/57 711/E12.001 |
| 2013/0185564 A1* | 7/2013 | Jaber | ........................ | G06F 21/57 713/176 |
| 2016/0246585 A1* | 8/2016 | Li | ............................. | G06F 8/65 |
| 2018/0129479 A1* | 5/2018 | McPherson | ................ | G06F 8/63 |
| 2019/0042753 A1* | 2/2019 | Jreij | ....................... | G06F 21/575 |
| 2019/0056925 A1* | 2/2019 | Komano | ............. | H04L 41/0866 |
| 2020/0119929 A1* | 4/2020 | Edwards | ............... | H04L 9/3265 |
| 2020/0193065 A1* | 6/2020 | Smith | ................... | H04L 9/3242 |
| 2021/0073003 A1* | 3/2021 | Jacquin | ................... | G06F 21/44 |
| 2021/0209231 A1* | 7/2021 | Weigand | .................. | G06F 8/65 |

OTHER PUBLICATIONS

TCG PC Client Reference Integrity Manifest Specification, Version 0.15, Trusted Computing Group, Mar. 31, 2020; 27 pages.

Leach, P. et al., "A Universally Unique IDentifier (UUID) URN Namespace", Network Working Group, Jul. 2005; 32 pages.

TCG PC Client Platform Firmware Profile Specification, Version 1.05, Trusted Computing Group, Sep. 16, 2020; 145 pages.

TCG PC Client Platform TPM Profile Specification for TPM 2.0, Version 1.05, Trusted Computing Group, Sep. 4, 2020; 176 pages.

TCG PC Client Platform Firmware Integrity Measurement, Version 1.0, Trusted Computing Group, Sep. 15, 2020; 21 pages.

* cited by examiner

SYSTEM AND METHOD OF AUTHENTICATING UPDATED FIRMWARE OF AN INFORMATION HANDLING SYSTEM

BACKGROUND

Field of the Disclosure

This disclosure relates generally to information handling systems and more particularly to authenticating updated firmware of an information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, a first information handling system may receive a chained cryptographic hash value determined by a trusted platform module of a second information handling system; may receive multiple patch identities associated with multiple updated firmware installed on multiple components of the second information handling system; may receive an event log associated with output of the trusted platform module as the trusted platform module determined the chained cryptographic hash value; may retrieve multiple layered endorsements respectively associated with the multiple patch identities; may determine multiple hash values from multiple signatures stored in the multiple layered endorsements; may compare the chained cryptographic hash value with the event log; may compare multiple event information with the multiple hash values; and may determine that the second information handling system has booted into a trusted state based at least on comparing the chained cryptographic hash value with the event log and comparing the multiple event information with the multiple hash values.

In one or more embodiments, the first information handling system may further determine that the second information handling system has not booted into the trusted state based at least on comparing the chained cryptographic hash value with the event log and comparing the multiple event information with the multiple hash values. For example, at least one remediation process may be performed on the second information handling system. In one instance, the second information handling system may perform at least one remediation process on the second information handling system. In another instance, the first information handling system may perform at least one remediation process on the second information handling system.

In one or more embodiments, performing the at least one remediation process on the second information handling system may include reinstalling at least one of the multiple updated firmware installed on the multiple components of the second information handling system. In one or more embodiments, retrieving the multiple layered endorsements respectively associated with the multiple patch identities may include retrieving the multiple layered endorsements from a database. In one or more embodiments, the chained cryptographic hash value may be determined via the trusted platform module by determining a hash value of a concatenation of at least two hash values respectively associated with at least two of the multiple updated firmware.

In one or more embodiments, each layered endorsement of the multiple layered endorsements includes a signature of a reference integrity measurement associated with the firmware associated with the layered endorsement. In one example, the signature of the reference integrity measurement may include an encrypted hash value of the reference integrity measurement. In a second example, the reference integrity measurement may be associated with updated firmware of the multiple updated firmware. In another example, at least one of the multiple components of the second information handling system may include a baseboard management controller, a volatile memory medium, a non-volatile memory medium, an I/O subsystem, a network interface, a touchpad controller, a liquid crystal display controller, a microcontroller, or an expansion card, among others. For instance, the expansion card may include a graphics card, a network card, a RAID (redundant array of inexpensive disks) card, a non-volatile memory medium card, a cryptography card, an audio processing card, a video processing card, an audio/video processing card, a physics processing card, an artificial intelligence card, a host adapter card, or a clock card, among others.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
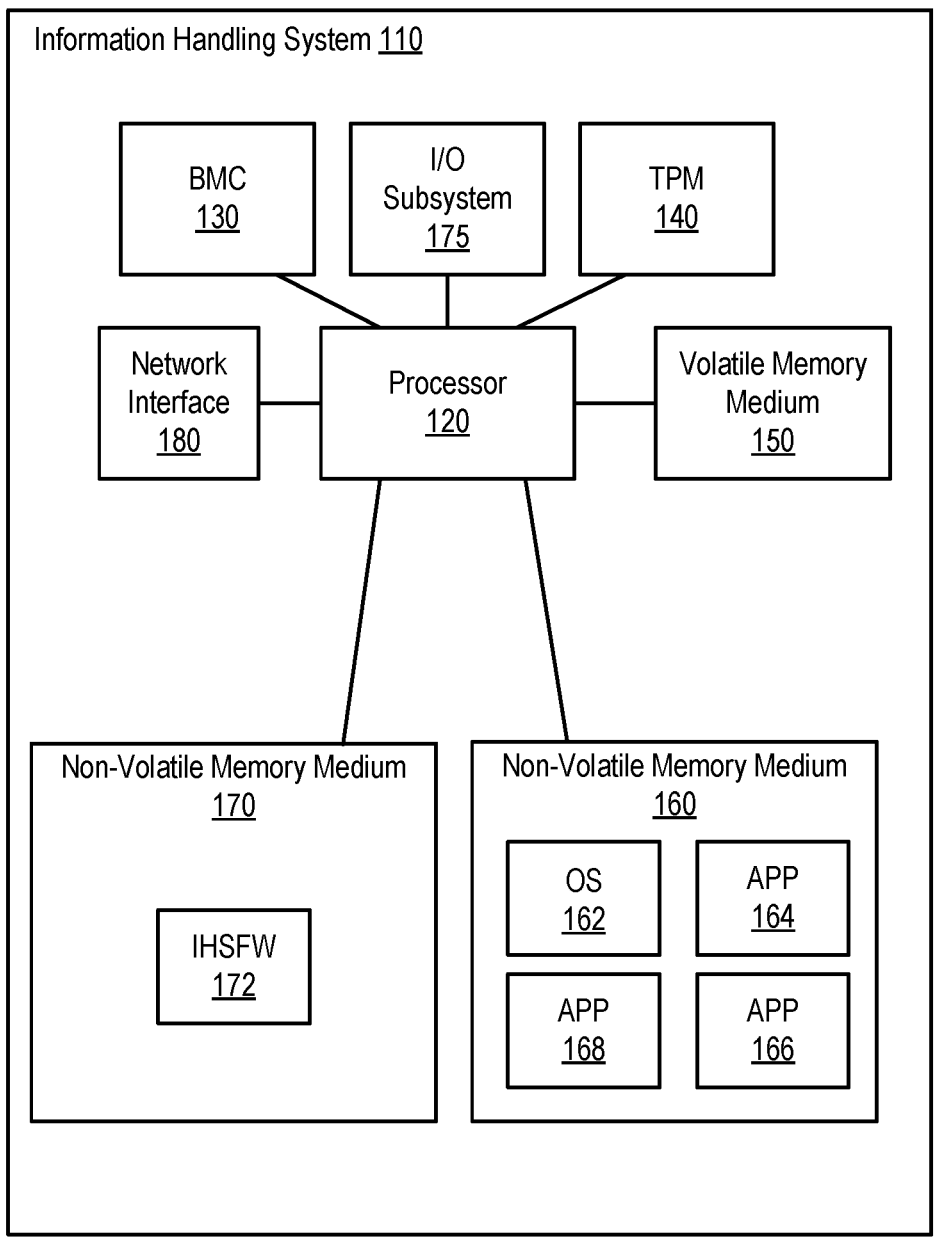
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, integrity measurements (e.g., hash values) may be captured to verify that a state of executable code (e.g., software, firmware, etc.) on an information handling system has not been compromised. In one or more embodiments, reference measurements (e.g., golden measurements) may be utilized by a verifier in an executable code integrity verification process to compare a state of currently installed executable code with intended executable code. For example, the verifier in the executable code integrity verification process determine if a measurement (e.g., a hash value) of executable code matches a reference measurement.

In one or more embodiments, when executable code is provided by a third party supplier, one or more reference measurements provided by the third party supplier may serve as respective one or more endorsements that a state of the supplied executable code is intact as the third party supplier intended. In one or more embodiments, an information handling system produced by an original equipment manufacturer (OEM) may include a collection of OEM executable code and component executable code, which may include disaggregated executable code from multiple third party component suppliers.

In one or more embodiments, a customer of the OEM may want or need to verify an integrity of an information handling system produced by the OEM. For example, verifying the integrity of the information handling system may include verifying OEM executable code state and any third party executable code state, which may originate from one or more different endorsement paths. For instance, a method and/or a process may determine that third party executable code state matches what was shipped by the OEM. In one or more embodiments, a state of a collection of components associated with the OEM may reflect a state of the information handling system as the information handling system was assembled and endorsed by the OEM. For example, the state of the information handling system as the information handling system was assembled and endorsed by the OEM may include a state of third party component executable code included in the information handling system, which may be endorsed by the third party suppliers.

In one or more embodiments, the OEM may endorse an aggregated state of multiple components in the information handling system as well as how the information handling system recognizes the multiple components. For example, the OEM may verify an individual component of the multiple components in the information handling system and may provide an endorsement associated with the individual component of the multiple components. In one or more embodiments, one or more systems, one or more methods, and/or one or more processes may gather endorsements from third parties, may build the third party endorsements into an OEM endorsed package, and may provide information associated with lineages of components from their suppliers. For example, the one or more systems, the one or more methods, and/or the one or more processes may layer endorsements from various places in one or more supply chains.

In one or more embodiments, one or more components of the information handling system may include one or more of a processor (e.g., a central processing unit), a baseboard management controller, a volatile memory medium, a non-volatile memory medium, an I/O subsystem, a network interface, a touchpad controller, a liquid crystal display (LCD) controller, a microcontroller, and an expansion card, among others. For example, an expansion card may include a graphics card, a network card, a RAID (redundant array of inexpensive disks) card, a non-volatile memory medium card, a cryptography card, an audio processing card, a video processing card, an audio/video processing card, a physics processing card, an artificial intelligence card, a host adapter card, or a clock card, among others.

In one or more embodiments, the OEM may obtain and/or receive reference measurements, signed by third party suppliers, along with references and/or pointers (e.g., addresses) to signing certificates (e.g., supplier endorsements) associated with the third party suppliers. For example, the OEM may assemble a reference measurement package of aggregated information handling system components, which may include OEM executable code and third party executable code. For instance, the OEM may provide a signed reference manifest of components of the information handling system to the customer.

In one or more embodiments, a signed reference manifest may be extended with reference manifests of the components of the information handling system. For example, the reference manifests of the components of the information handling system may be signed by the third party component suppliers. For instance, the signed reference manifest, extended with reference manifests of the components of the information handling system, may be stored on the information handling system, and/or may be provided to the information handling system via a network. As an example, the signed reference manifest, extended with reference manifests of the components of the information handling system, may be provided to the customer via a customer service portal associated with the OEM.

In one or more embodiments, the OEM may provide an OEM agent and verification service to verify a current state of the information handling system. For example, the customer may deconstruct and extract information from the OEM reference measurement package, challenge the information handling system for OEM measurements, which may confirm a current state (e.g., an aggregation of OEM executable code and third party component executable code) of the information handling system. In one instance, the customer may utilize the OEM agent to parse a list of third party components. In another instance, the customer may utilize the OEM agent to use pointers (e.g., addresses) to verify integrity of the third party component executable code.

In one or more embodiments, the OEM may source reference measurements from third parties in a supply chain and may link the reference measurements from the third parties in the supply chain. In one or more embodiments, one or more components of the information handling system may include any component of the information handling system that includes updatable firmware. For example, firmware may be updated to address one or more bugs, one or more vulnerabilities, and/or add one or more new features, among others. In one or more embodiments, the one or more systems, the one or more methods, and/or the one or more processes may create a cryptographic representation of components of the information handling system. For example, the one or more systems, the one or more methods, and/or the one or more processes may create cryptographic representation of components of the information handling system that is endorsed by the OEM.

In one or more embodiments, the OEM may release a new version of OEM executable code and/or component executable code and may not be able to enable a new composite reference integrity measurement for every combination and permutation of OEM and component executable code. If component executable code is updated, the customer may want or need to verify the component executable code. For example, verifying the component executable code may include accessing every component vendor to obtain an endorsement associated with the component executable code, if such an endorsements exists. For instance, the customer may not be able to receive assurances and/or endorsements that component executable combinations are trustworthy.

In one or more embodiments, the OEM may cross sign each reference measurement with an OEM signing key, which may point to an OEM signing certificate (e.g., an OEM endorsement) and one or more signing certificates associated with a third party supplier. For example, the OEM may create and/or produce a layered endorsement, which may include a signature of a reference measurement and may include one or more signing certificates associated with the third party supplier.

In one or more embodiments, the OEM may assemble signed reference measurements, which may include including OEM executable code and third party executable code (e.g., component executable code), in a database available to the verification service. For example, the OEM may build layered endorsements into one or more OEM update packages for each component. For instance, when the information handling system is updated, an OEM update package may store one or more layered endorsements and identifying metadata in a memory medium of the information handling system. As an example, the one or more layered endorsements and identifying metadata may be stored via a boot partition of the information handling system. In one or more embodiments, the OEM agent and the verification service may verify component layered endorsements and updated firmware.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a baseboard management controller (BMC) 130, a trusted platform module (TPM) 140, a volatile memory medium 150, non-volatile memory media 160 and 170, an I/O subsystem 175, and a network interface 180. As illustrated, BMC 130, TPM 140, volatile memory medium 150, non-volatile memory media 160 and 170, I/O subsystem 175, and network interface 180 may be communicatively coupled to processor 120.

In one or more embodiments, one or more of BMC 130, TPM 140, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, TPM 140, volatile memory medium 150, non-volatile memory media 160 and 170, I/O subsystem 175, and network interface 180 may be communicatively coupled to processor 120 via one or more PCI-Express (PCIe) root complexes. In another example, one or more of BMC 130, TPM 140, I/O subsystem 175, and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162, and APPs 164-168 may include processor instructions executable by processor 120. In one example, processor 120 may execute processor instructions of one or more of OS 162, and APPs 164-168 via non-volatile memory medium 160. In another example, one or more portions of the processor instructions of the one or more of OS 162, and APPs 164-168 may be transferred to volatile memory medium 150, and processor 120 may execute the one or more portions of the processor instructions of the one or more of OS 162, and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, a microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, an application processor may be or include an ARM Cortex-A processor. In another example, an application processor may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

In one or more embodiments, TPM 140 may include one or more of a microcontroller, a hardware random number generator, a hash value generator, a non-volatile memory medium, and a volatile memory medium, among others. In one example, the non-volatile memory medium of TPM 140 may store one or more of an endorsement key and a storage root key, among others. In a second example, the volatile memory medium of TPM 140 may be utilized to store one or more of an attestation identity key and storage keys, among others. In a third example, the volatile memory medium of TPM 140 may be utilized to implement one or more registers. For instance, the volatile memory medium of TPM 140 may be utilized to implement one or more platform configuration registers (PCRs). In another example, the microcontroller may be configured to secure hardware through integrated cryptographic keys. In one or more embodiments, TPM 140 may be compliant with International Organization for Standardization (ISO)/International Electrotechnical Commission (IEC) 11889. In one or more embodiments, TPM 140 may be compliant with one or more TPM specifications available from the Trusted Computing Group (TCG). In one or more embodiments, TPM 140 may be or include one or more of a FPGA and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

In one or more embodiments, TPM 140 may be utilized to assure the integrity of IHS 110. In that context, for example, "integrity" may mean "behave as intended". In one or more embodiments, TPM 140 may be utilized to ensure that a boot process begins from a trusted combination of hardware and software and may continue until OS 162 has fully booted. In one or more embodiments, IHSFW 172 may utilize TPM 140 form a root of trust. For example, one or more of the PCRs may be utilized for secure storage and/or reporting of one or more security metrics. For example, the one or more security metrics may be utilized to detect one or more changes from a previous configuration and/or may determine how to proceed if the one or more changes from the previous configuration are detected.

Figure 2:
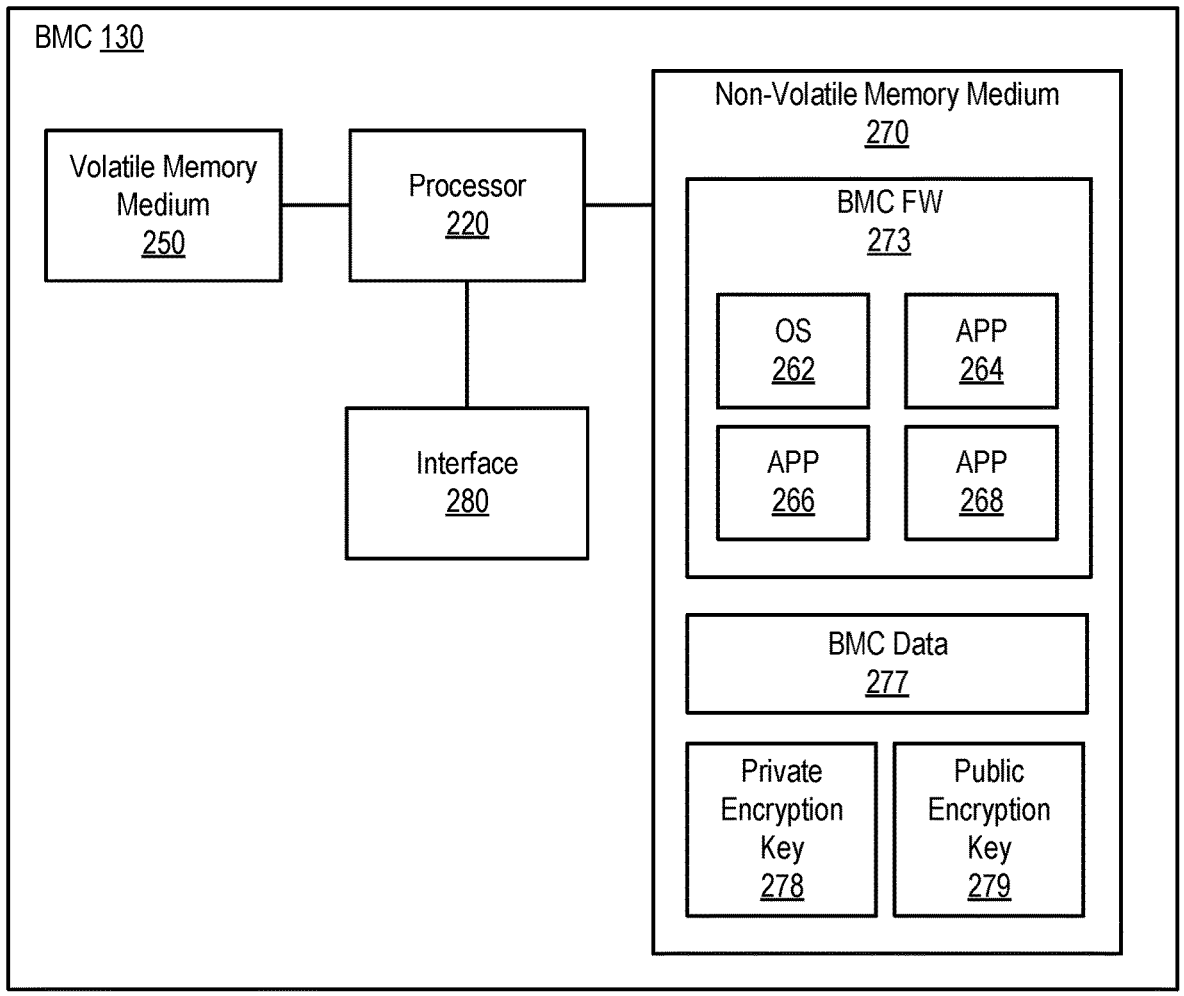
FIG. 2 illustrates an example of a baseboard management controller, according to one or more embodiments.

Turning now to FIG. 2, an example of a baseboard management controller is illustrated, according to one or more embodiments. As shown, BMC 130 may include a processor 220, a volatile memory medium 250, a non-volatile memory medium 270, and an interface 280. As illustrated, non-volatile memory medium 270 may include a BMC firmware (FW) 273, which may include an OS 262 and APPs 264-268, and may include BMC data 277. In one example, OS 262 may be or include a real-time operating system (RTOS). For instance, the RTOS may be or include FreeRTOS, OpenRTOS, SafeRTOS, QNX, ThreadX, VxWorks, NuttX, TI-RTOS, eCos, MicroC/OS, or Zephyr, among others. In a second example, OS 262 may be or include an Unix-like operating system. For instance, the Unix-like operating system may be or include LINUX®, FREEBSD®, NETBSD®, OpenBSD, Minix, Xinu, or Darwin, among others. In another example, OS 262 may be or include a portable operating system interface (POSIX) compliant operating system. As illustrated, non-volatile memory medium 270 may include a private encryption key 278. As shown, non-volatile memory medium 270 may include a public encryption key 279. In one or more embodiments, private encryption key 278 may be different from public encryption key 279. For example, private encryption key 278 and public encryption key 279 may be asymmetric encryption keys. In one instance, data encrypted via private encryption key 278 may be decrypted via public encryption key 279. In another instance, data encrypted via public encryption key 279 may be decrypted via private encryption key 278.

In one or more embodiments, interface 280 may include circuitry that enables communicatively coupling to one or more devices. In one example, interface 280 may include circuitry that enables communicatively coupling to one or more buses. For instance, the one or more buses may include one or more buses described herein, among others. In a second example, interface 280 may include circuitry that enables one or more interrupt signals to be received. In one instance, interface 280 may include general purpose input/output (GPIO) circuitry, and the GPIO circuitry may enable one or more interrupt signals to be received and/or provided via at least one interrupt line. In another instance, interface 280 may include GPIO circuitry that may enable BMC 130 to provide and/or receive signals associated with other circuitry (e.g., diagnostic circuitry, etc.). In a third example, interface 280 may include circuitry that enables communicatively coupling to one or more networks. In one instance, interface 280 may include circuitry that enables communicatively coupling to network interface 180. In another example, interface 280 may include a network interface.

In one or more embodiments, one or more of OS 262 and APPs 264-268 may include processor instructions executable by processor 220. In one example, processor 220 may execute processor instructions of one or more of OS 262 and APPs 264-268 via non-volatile memory medium 270. In another example, one or more portions of the processor instructions of the one or more of OS 262 and APPs 264-268 may be transferred to volatile memory medium 250, and processor 220 may execute the one or more portions of the processor instructions of the one or more of OS 262 and APPs 264-268 via volatile memory medium 250. In one or more embodiments, processor 220 may execute instructions in accordance with at least a portion of one or more systems, at least a portion of one or more flowcharts, one or more methods, and/or at least a portion of one or more processes described herein. For example, non-volatile memory medium 270 and/or volatile memory medium 250 may store instructions that may be executable in accordance with at least a portion of one or more systems, at least a portion of one or more flowcharts, at least a portion of one or more methods, and/or at least a portion of one or more processes described herein. In one or more embodiments, processor 220 may execute instructions in accordance with at least a portion of one or more of systems, flowcharts, at least a portion of one or more methods, and/or at least a portion of one or more processes described herein. For example, non-volatile memory medium 270 and/or volatile memory medium 250 may store instructions that may be executable in accordance with at least a portion of one or more of systems, at least a portion of one or more flowcharts, at least a portion of one or more methods, and/or at least a portion of one or more processes described herein. In one or more embodiments, processor 220 may utilize BMC data 277. In one example, processor 220 may utilize BMC data 277 via non-volatile memory medium 270. In another example, one or more portions of BMC data 277 may be transferred to volatile memory medium 250, and processor 220 may utilize BMC data 277 via volatile memory medium 250.

Figure 3:
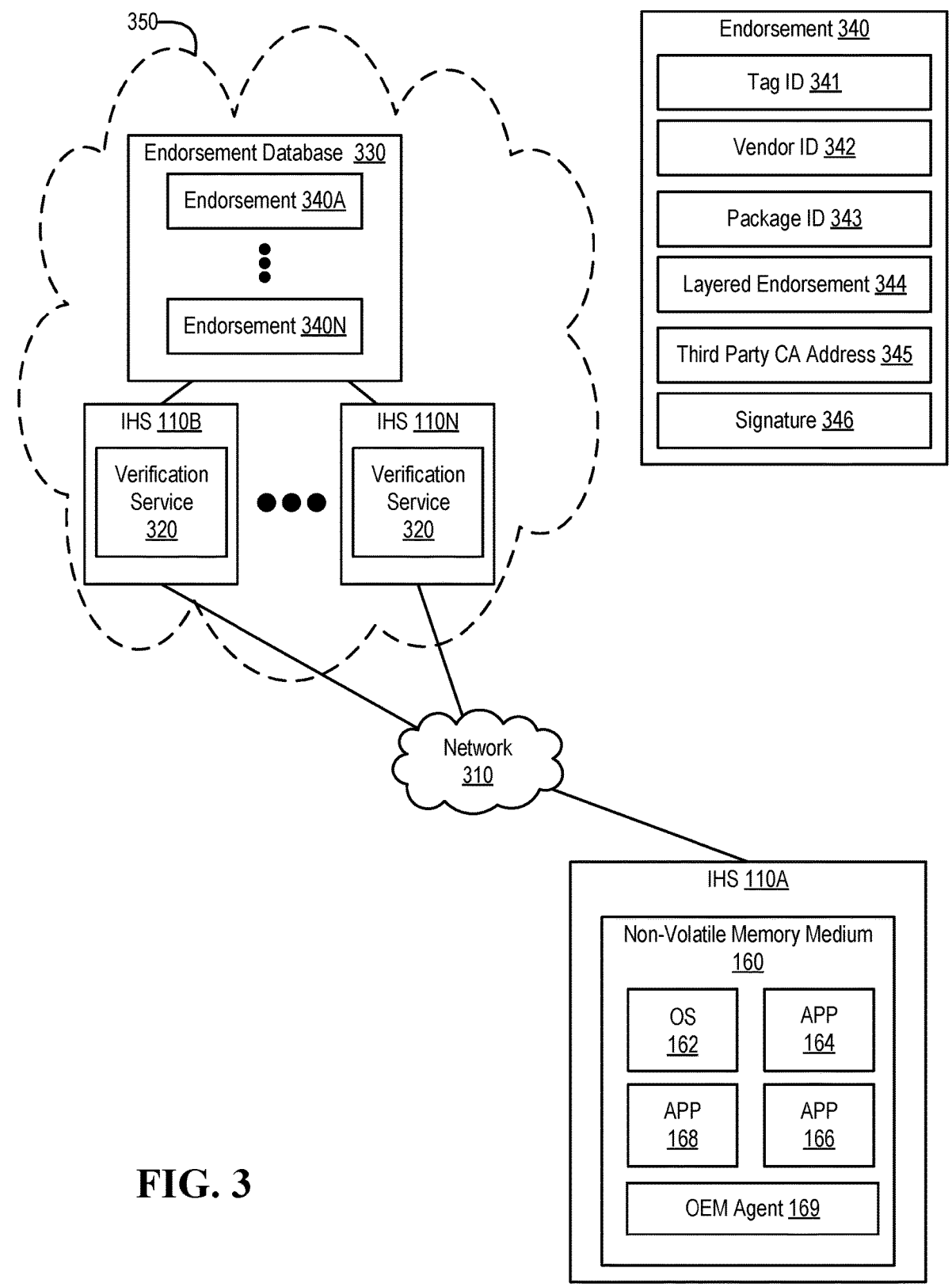
FIG. 3 illustrates an example of a system, according to one or more embodiments.

Turning now to FIG. 3, an example of a system is illustrated, according to one or more embodiments. In one or more embodiments, an IHS 110A may be coupled to a network 310. In one or more embodiments, network 310 may include a wired network, a wireless network, an optical network, or a combination of the foregoing, among others. For example, network 310 may include and/or may be coupled to various types of communications networks. For instance, network 310 may include and/or may be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others.

In one or more embodiments, information handling systems (IHSs) 110B-110N may be coupled to network 310. For example, each of IHSs 110B-110N may include a verification service 320. In one or more embodiments, IHSs 110B-110N may be coupled to an endorsement database 330. For example, endorsement database 330 may include endorsements 340A-340N. In one or more embodiments, an endorsement 340 may include one or more of a tag identification (ID) 341, a vendor ID 342, a package ID 343, a layered endorsement 344, a third party certificate authority (CA) address 345, and a signature 346, among others. In one or more embodiments, a third party CA address 345 may include one or more of a uniform resource identifier (URI), a uniform resource locator (URL), a uniform resource name (URN), a logical address, a network address, and an IP address, among others.

In one or more embodiments, an OEM cloud solution 350 may include IHSs 110B-110N and endorsement database 330. Although IHSs 110B-110N are illustrated, OEM cloud solution 350 may include any number of IHSs 110, according to one or more embodiments. Moreover, although endorsement database 330 is illustrated, OEM cloud solution 350 may include any number of endorsement databases 330, according to one or more embodiments. Furthermore, although endorsements 340A-340N are illustrated, endorsement database 330 may include any number of endorsements 340.

In one or more embodiments, memory medium 160 of IHS 110A may include an OEM agent 169. In one example, OEM agent 169 may be or may include an application. In a second example, OEM agent 169 may be or may include a service (e.g., a Windows service). In another example, OEM agent 169 may be or may include a background application (e.g., a Unix daemon, a Unix-like daemon, etc.). In one or more embodiments, OEM agent 169 may be executed in an operating system context. For example, OEM agent 169 may be executed in a context of OS 162. In one or more embodiments, OEM agent 169 may include processor instructions executable by processor 120. In one example, processor 120 may execute processor instructions of OEM agent 169 via non-volatile memory medium 160. In another example, one or more portions of the processor instructions of OEM agent 169 may be transferred to volatile memory medium 150, and processor 120 may execute the one or more portions of the processor instructions of the OEM agent 169 via volatile memory medium 150. In one or more embodiments, OEM agent 169 may communicate with verification service 320. For example, OEM agent 169 may communicate with verification service 320 via network 310. In one or more embodiments, the processor instructions of OEM agent 169 may be executed by processor 120 in implementing at least a portion of one or more systems, at least a portion of one or more flowcharts, at least a portion of one or more methods, and/or at least a portion of one or more processes described herein.

Figure 4A:
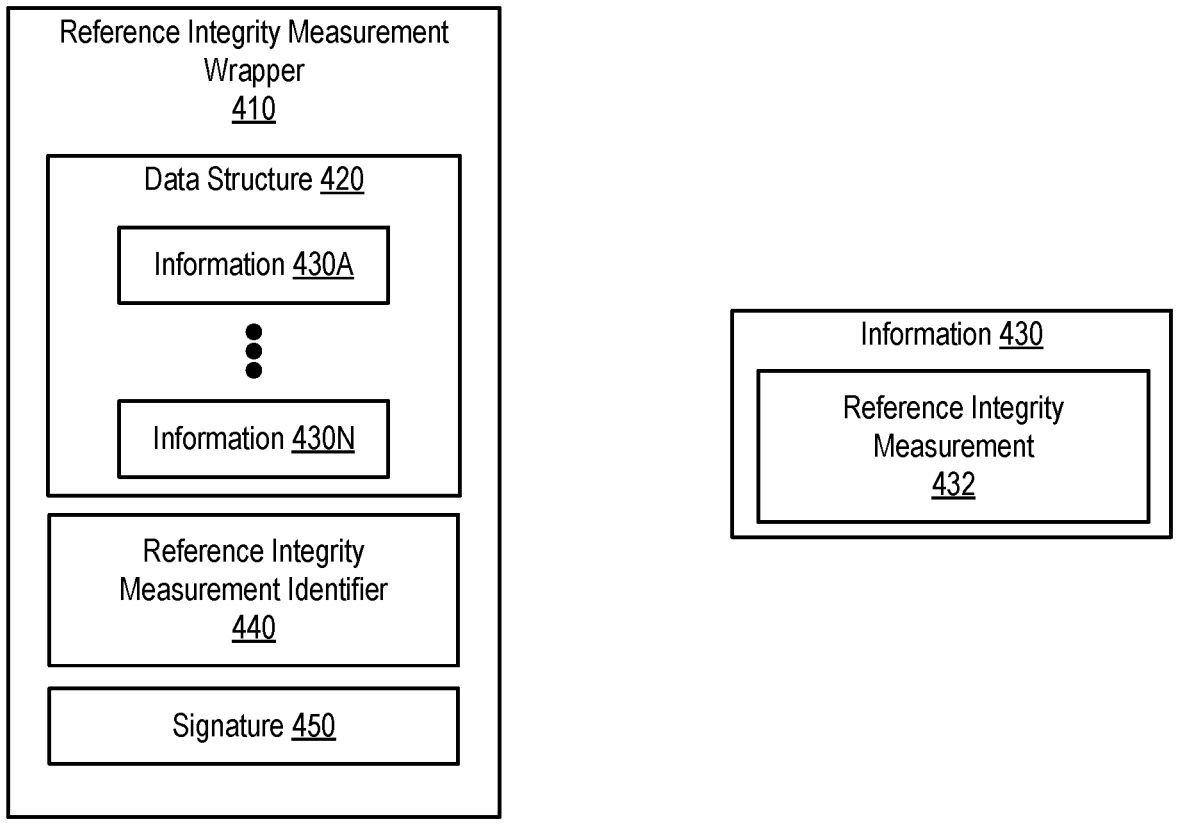
FIG. 4A illustrates an example of a reference integrity measurement wrapper, according to one or more embodiments.

Turning now to FIG. 4A, an example of a reference integrity measurement wrapper is illustrated, according to one or more embodiments. In one or more embodiments, a reference integrity measurement wrapper 410 may include a data structure 420. For example, data structure 420 may include information 430A-430N. Although information 430A-430N are illustrated, data structure 420 may include any number of information 430, according to one or more embodiments.

In one or more embodiments, one or more of information 430A-430N may include one or more of information associated with a component of IHS 110A, information associated with a vendor of a component of IHS 110A, information associated with firmware of a component of IHS 110A, a hash value of firmware of a component of IHS 110A, a hash value of IHSFW 172 of IHS 110A, and a hash value of BMC FW 273 of IHS 110A, among others. In one or more embodiments, one or more of information 430A-430N may include one or more data structures. In one example, information 430 may include a signed certificate. In another example, information 430 may include a software identification (SWID) tag. For instance, a SWID tag may be or may include a signed data structure.

In one or more embodiments, an information 430 may include a reference integrity measurement 432. In one or more embodiments, a signed certificate of information 430 may include an attribute certificate. For example, attributes of the signed certificate of information 430 may include hash values of firmware elements. In one or more embodiments, a signed certificate of information 430 may be signed by a provider of the signed certificate of information 430.

In one or more embodiments, reference integrity measurement wrapper 410 may include a reference integrity measurement identifier 440. For example, reference integrity measurement identifier 440 may be utilized to identify a reference integrity measurement wrapper. In one example, reference integrity measurement identifier 440 may include a universally unique identifier (UUID). In another example, reference integrity measurement identifier 440 may include a globally unique identifier (GUID).

In one or more embodiments, a hash value of data may be determined via a one-way hash function. In one example, a one-way hash function may be relatively easy to compute. For instance, for data x (e.g., a number, a string, binary data, etc.) and a one-way hash function h, h(x) may be relatively easy to compute. In another example, a one-way hash function may significantly difficult to reverse. For instance, for the one-way hash function h and a hash value h(z), z may be significantly difficult to compute. In one or more embodiments, significantly difficult to compute may mean that it may take years to compute z from h(z), even if multiple computers were applied to such a task.

In one or more embodiments, a one-way hash function may be considered collision free. For example, the one-way hash function may be injective or one-to-one. For instance, $h(z_1)$ and $h(z_2)$ may produce different values, where $z_1$ and $z_2$ are different. In one or more embodiments, a one-way hash function may be considered a cryptographic checksum value, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-256, SHA-384, etc.), and a SNEFRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1=h_2(h_3(h_4(z)))$. For instance, a one-way hash function that is a composite function of two or more one-way hash functions may be considered to be and/or may be said to be strengthened.

In one or more embodiments, reference integrity measurement wrapper 410 may include a signature 450. For example, signature 450 may be a signature of data structure 420. For instance, signature 450 may be an encrypted hash value of data structure 420. As an example, a hash value of data structure 420 may be encrypted with a private encryption key to produce signature 450. In one or more embodiments, a public encryption key associated with the private encryption key may be utilized to decrypt signature 450 to produce the hash value of data structure 420.

In one or more embodiments, reference integrity measurement wrapper 410 may be stored by IHS 110A. In one example, reference integrity measurement wrapper 410 may be stored via non-volatile memory medium 160 of IHS 110A. For instance, reference integrity measurement wrapper 410 may be stored via a system partition of non-volatile memory medium 160 of IHS 110A. In another example, reference integrity measurement wrapper 410 may be stored via non-volatile memory medium 170 of IHS 110A. In one or more embodiments, an OEM may store reference integrity measurement wrapper 410. For example, IHS 110A may download reference integrity measurement wrapper 410 from the OEM. For instance, IHS 110A may download reference integrity measurement wrapper 410 from one of IHSs 110B-110N via network 310.

Figure 4B:
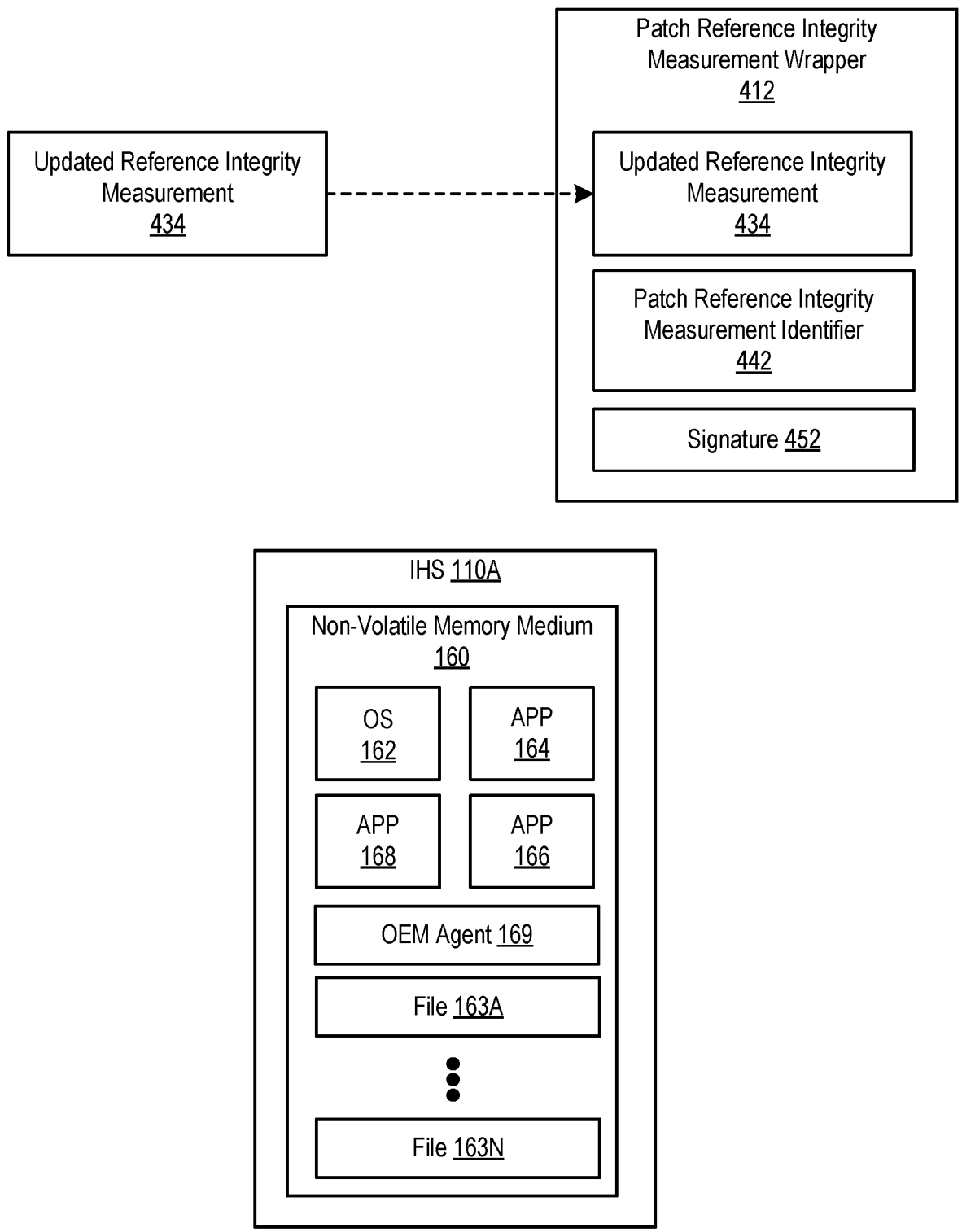
FIG. 4B illustrates an example of a patch reference integrity measurement wrapper, according to one or more embodiments.

Turning now to FIG. 4B, an example of a patch reference integrity measurement wrapper is illustrated, according to one or more embodiments. In one or more embodiments, an OEM may produce a patch reference integrity measurement wrapper 412 for an updated reference integrity measurement 434. For example, patch reference integrity measurement wrapper 412 may include updated reference integrity measurement 434. For instance, updated reference integrity measurement 434 may be provided to an OEM from a third party supplier and/or a third party vendor. In one or more embodiments, updated reference integrity measurement 434 may be associated with updated firmware provided to the OEM from the third party supplier and/or the third party vendor.

In one or more embodiments, patch reference integrity measurement wrapper 412 may include a patch reference integrity measurement identifier 442. For example, patch reference integrity measurement identifier 442 may be assigned to patch reference integrity measurement wrapper 412. In one or more embodiments, a patch reference integrity measurement identifier 442 may be utilized to identify a patch reference integrity measurement wrapper 412. In one example, patch reference integrity measurement identifier 442 may include a UUID. In another example, patch reference integrity measurement identifier 442 may include a GUID.

In one or more embodiments, patch reference integrity measurement wrapper 412 may include a signature 452. For example, signature 452 may be a signature of updated reference integrity measurement element 434. For instance, signature 452 may be an encrypted hash value of updated reference integrity measurement 434. As an example, a hash value of updated reference integrity measurement 434 may be encrypted with a private encryption key, associated with the OEM, to produce signature 452.

In one or more embodiments, non-volatile memory medium 160 of IHS 110A may include files 163A-163N. For example, a file 163 may include a patch reference integrity measurement wrapper 412. In one or more embodiments, files 163A-163N may be stored via a boot partition of non-volatile memory medium 160 of IHS 110A. In one or more embodiments, a file 163 may be associated with a file name. For example, a first file 163 may be associated with a first file name, and a second file 163 may be associated with a second file name, different from the first file name. For instance, a file name associated with a file 163 may include an associated patch reference integrity measurement identifier 442. Although files 163A-163N are illustrated, non-volatile memory medium 160 of IHS 110A may include any number of files 163.

Figure 5A:
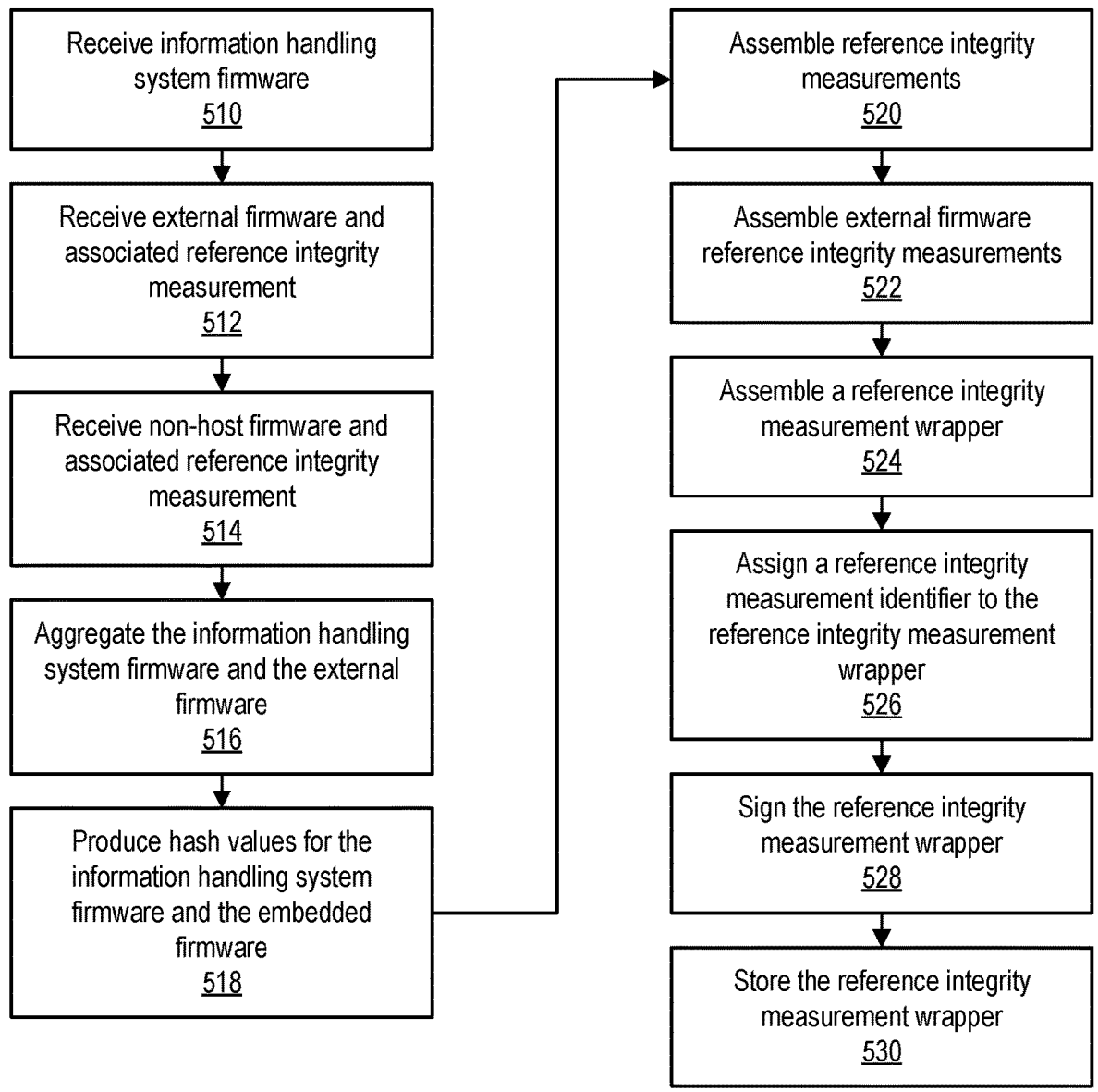
FIG. 5A illustrates an example of a method of operating a system, according to one or more embodiments.

Turning now to FIG. 5A, an example of a method of operating a system is illustrated, according to one or more embodiments. At 510, information handling system firmware may be received. For example, IHSFW 172 may be received. At 512, external firmware and an associated reference integrity measurement may be received. For example, the external firmware may be received from a third party (e.g., a third party vendor, a third party supplier, etc.). For instance, the external firmware may be executed by processor 120. In one or more embodiments, method element 512 may be repeated for each external firmware and its associated reference integrity measurement.

At 514, non-host firmware and an associated reference integrity measurement may be received. For example, the non-host firmware may be firmware may not be executed by processor 120. For instance, the non-host firmware may be executed by a component of IHS 110A, which is not processor 120. In one or more embodiments, method element 514 may be repeated for each non-host firmware and its associated reference integrity measurement.

At 516, the information handling system firmware and the external firmware may be aggregated. At 518, hash values for the information handling system firmware and the embedded firmware may be produced. At 520, reference integrity measurements may be assembled. At 522, external firmware reference integrity measurements may be assembled. At 524, a reference integrity measurement wrapper may be assembled. For example, reference integrity measurement wrapper 410 may be assembled.

At 526, a reference integrity measurement identifier may be assigned to the reference integrity measurement wrapper. In one or more embodiments, a reference integrity measurement identifier 440 may be utilized to identify a reference integrity measurement wrapper 410. In one example, the reference integrity measurement identifier may include a UUID. For instance, a UUID may include a 128-bit label, which may be unique within IHS 110 for use within IHS 110. In another example, the reference integrity measurement identifier may include a GUID. For instance, a GUID may include a 128-bit label, which may be unique within IHS 110 for use within IHS 110. In one or more embodiments, a first number of bits of a GUID may include an identifier. For example, the first three bits of a GUID may be "110". In one or more embodiments, a GUID may be or may include a UUID.

At 528, the reference integrity measurement wrapper may be signed. For example, a signature of reference integrity measurement wrapper may be produced. For instance, the signature of reference integrity measurement wrapper may be signature 450. At 530, the reference integrity measurement wrapper may be stored. In one example, IHS 110 may store the reference integrity measurement wrapper. In one instance, non-volatile memory medium 160 may store the reference integrity measurement wrapper. In another instance, non-volatile memory medium 170 may store the reference integrity measurement wrapper. In another example, a server of the OEM (e.g., an information handling system of the OEM) may store the reference integrity measurement wrapper. For instance, the OEM may store the reference integrity measurement wrapper for a later download. As an example, IHS 110A may download the reference integrity measurement wrapper from the OEM (e.g., from an information handling system of the OEM). In one or more embodiments, the method illustrated in FIG. 5A may be utilized in creating reference integrity manifests for components in an information handling system.

Figure 5B:
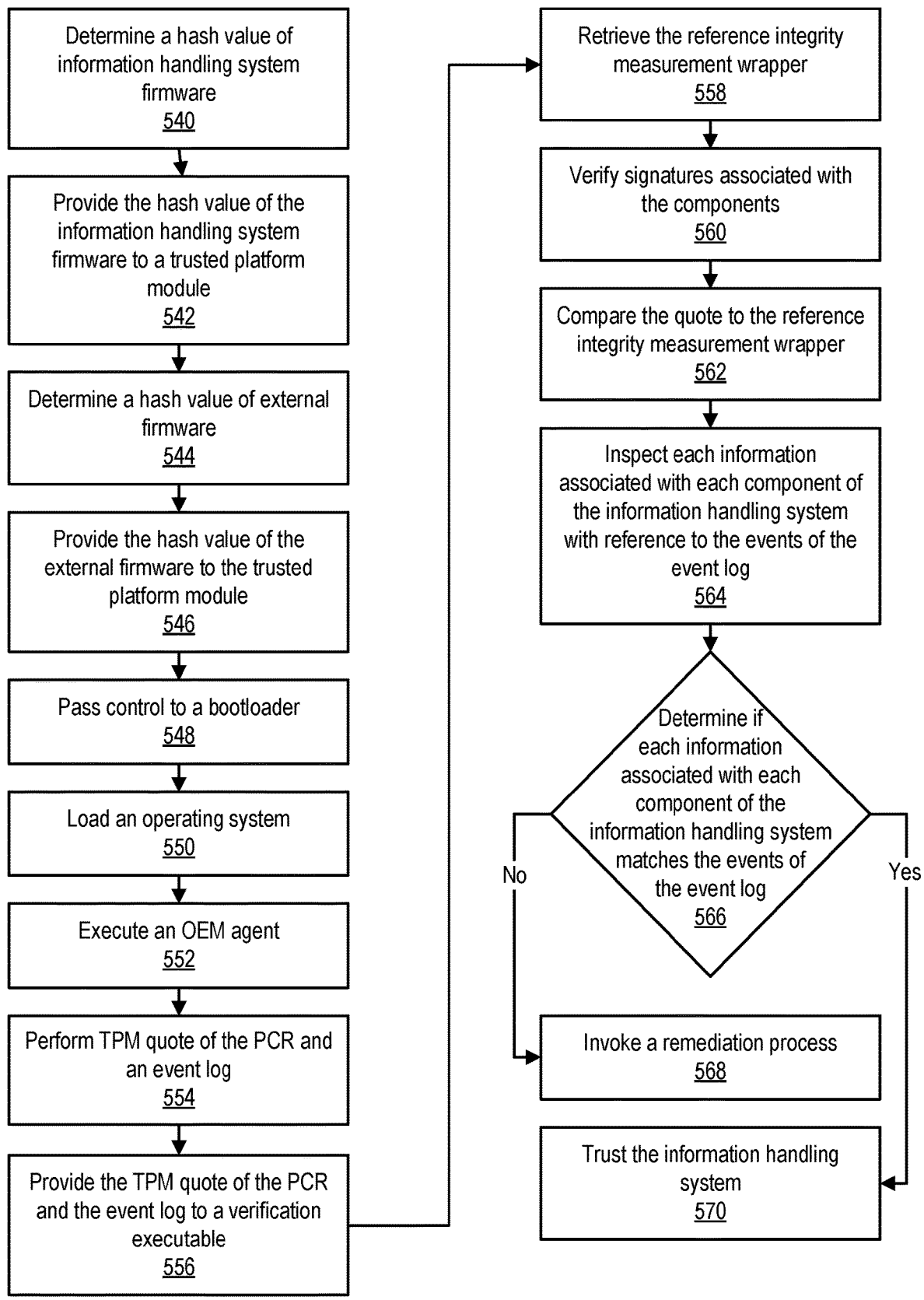
FIG. 5B illustrates a second example of a method of operating a system, according to one or more embodiments.

Turning now to FIG. 5B, a second example of a method of operating a system is illustrated, according to one or more embodiments. At 540, a hash value of information handling system firmware may be determined. For example, a hash value of IHSFW 172 may be determined. For instance, IHSFW 172 may determine a hash value of IHSFW 172.

At 542, the hash value of the information handling system firmware may be provided to a trusted platform module. For example, the hash value of IHSFW 172 may be provided to TPM 140 of IHS 110A. For instance, IHSFW 172 of IHS 110A may provide the hash value of IHSFW 172 TPM 140 of IHS 110A. In one or more embodiments, providing the hash value of the information handling system firmware to the TPM may include invoking a TPM command interface. For example, when the TPM command interface is invoked, a value may be passed to the TPM. For instance, the value may include a hash value (e.g., a digest value).

In one or more embodiments, passing the hash value of the information handling system firmware to the TPM may include providing the hash value of the information handling system firmware to a platform configuration register (PCR) of the TPM. For example, the TPM may store a previous hash value and may utilize an existing value of the PCR to determine a hash value of the previous hash value and the existing value of the PCR (e.g., the hash value of the information handling system firmware). For instance, the TPM may combine a previous value of the PCR and a current value of the PCR and may determine a hash value of a combination of the previous value of the PCR and the current value of the PCR. In one or more embodiments, combining a previous value of the PCR and a current value of the PCR may include concatenating the current value of the PCR to the previous value of the PCR. In one or more embodiments, the TPM may determine a hash value of the combination of the previous value of the PCR and the current value of the PCR and may replace the current value of the PCR with the hash value of the combination of the previous value of the PCR and the current value of the PCR. In this fashion, a chained cryptographic hash value may be determined, which may be utilized to authenticate and/or validate multiple hash values, according to one or more embodiments.

At 544, a hash value of external firmware may be determined. For example, IHSFW 172 may determine a hash value of external firmware. At 546, the hash value of the external firmware may be provided to the trusted platform module. For example, the hash value of the external firmware may be provided to TPM 140 of IHS 110A. For instance, IHSFW 172 of IHS 110A may provide the hash value of the external firmware TPM 140 of IHS 110A. In one or more embodiments, providing the hash value of the external firmware to the TPM may include invoking a TPM command interface. For example, when the TPM command interface is invoked, a value may be passed to the TPM. For instance, the value may include a hash value (e.g., a digest value). In one or more embodiments, a hash value may be or may include a cryptographic checksum value.

In one or more embodiments, passing the hash value of the external firmware to the TPM may include providing the hash value of the external firmware to the PCR of the TPM. For example, the TPM may store a previous hash value and may utilize an existing value of the PCR to determine a hash value of the previous hash value and the existing value of the PCR (e.g., the hash value of the external firmware). For instance, the TPM may combine a previous value of the PCR and a current value of the PCR and may determine a hash value of a combination of the previous value of the PCR and the current value of the PCR. In one or more embodiments, combining a previous value of the PCR and a current value of the PCR may include concatenating the current value of the PCR to the previous value of the PCR. In one or more embodiments, the TPM may determine a hash value of the combination of the previous value of the PCR and the current value of the PCR and may replace the current value of the PCR with the hash value of the combination of the previous value of the PCR and the current value of the PCR. In this fashion, a chained cryptographic hash value may be determined, which may be utilized to authenticate and/or validate multiple hash values, according to one or more embodiments. In one or more embodiments, method elements 544 and 546 may be repeated for each external firmware.

At 548, control may be passed to a bootloader. For example, IHSFW 172 of IHS 110A may pass control to a bootloader of IHS 110A. For instance, non-volatile memory medium 160 of IHS 110A may store the bootloader of IHS 110A. At 550, an operating system may be loaded. For example, OS 162 of IHS 110A may be loaded. For instance, the bootloader may load OS 162 of IHS 110A.

At 552, an OEM agent may be executed. For example, execute OEM agent 169 may be executed by processor 120 of IHS 110A. For instance, processor 120 of IHS 110A may execute OEM agent 169 via a context of OS 162 of IHS 110A. At 554, a TPM quote of the PCR and an event log may be performed. For example, the OEM agent may perform a TPM quote of the PCR and an event log. For instance, the event log may be or may include a TCG log. As an example, the TCG log may be defined by TCG PC Client Platform Firmware Profile Specification, available from the Trusted Computing Group. In one or more embodiments, the event log may be captured by a reference integrity measurement creator. For example, the event log may be utilized as a reference integrity measurement support file. In one or more embodiments, the event log may be stored via volatile memory medium 150 of IHS 110A. For example, when a TPM command interface is invoked, an event may be logged in the event log. In one or more embodiments, when control is passed to the bootloader, control of the event log may be passed to the bootloader.

At 556, the TPM quote of the PCR and the event log may be provided to a verification executable. For example, the verification executable may be executed in an operating system context. In one instance, the verification executable may be or may include an application. In a second instance, the verification executable may be or may include a service (e.g., a Windows service). In another instance, the verification executable may be or may include a background application (e.g., a Unix daemon, a Unix-like daemon, etc.).

At 558, the reference integrity measurement wrapper may be retrieved. For example, the verification executable may retrieve the reference integrity measurement wrapper. At 560, signatures associated with the components may be verified. For example, the verification executable may verify signatures associated with the components. At 562, the quote may be compared to the reference integrity measurement wrapper. For example, the verification executable may compare the quote to the reference integrity measurement wrapper. In one or more embodiments, comparing the quote to the reference integrity measurement wrapper may include comparing one or more elements from the event log with one or more of information 430A-430N. For example, the verification executable may validate that the one or more elements from the event log match the one or more of information 430A-430N. For instance, when the verification executable validates that the one or more elements from the event log match the one or more of information 430A-430N, the verification executable may determine that the reference integrity measurement wrapper has not been tampered with.

At 564, each information associated with each component of the information handling system may be inspected with reference to the events of the event log. For example, the verification executable may inspect each information associated with each component of the information handling system with reference to the events of the event log. For instance, the verification executable may inspect each information 430 associated with each component of the information handling system with reference to the events of the event log.

At 566, it may be determined if each information associated with each component of the information handling system matches the events of the event log. For example, the verification executable may determine if each information 430 associated with each component of the information handling system matches the events of the event log. If each information associated with each component of the information handling system does not match the events of the event log, a remediation process may be invoked, at 568. If each information associated with each component of the information handling system matches the events of the event log, the information handling system may be trusted, at 570. In one or more embodiments, the method illustrated in FIG. 5B may be utilized in measuring firmware in an information handling system and in determining a trustworthiness of the information handling system via verifying measurements the firmware in the information handling system with reference measurements associated with the information handling system.

Figure 6A:
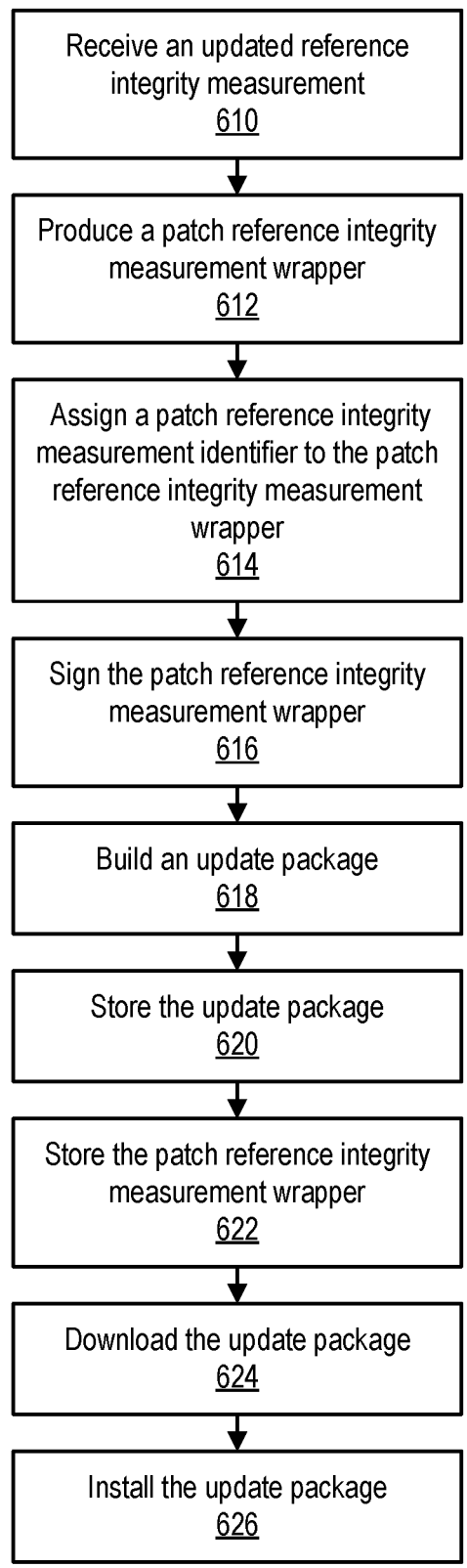
FIG. 6A illustrates a third example of a method of operating a system, according to one or more embodiments.

Turning now to FIG. 6A, a third example of a method of operating a system is illustrated, according to one or more embodiments. At 610, an updated reference integrity measurement may be received. For example, an updated reference integrity measurement 434 may be received. At 612, a patch reference integrity measurement wrapper may be produced. For example, patch reference integrity measurement wrapper 412 may be produced. For instance, patch reference integrity measurement wrapper 412 may include updated reference integrity measurement element 434.

At 614, a patch reference integrity measurement identifier may be assigned to the patch reference integrity measurement wrapper. For example, a patch reference integrity measurement identifier 442 may be assigned to patch reference integrity measurement wrapper 412. In one or more embodiments, a patch reference integrity measurement identifier 442 may be utilized to identify a patch reference integrity measurement wrapper 412. In one example, the patch reference integrity measurement identifier may include a UUID. In another example, the reference integrity measurement identifier may include a GUID.

At 616, the patch reference integrity measurement wrapper may be signed. For example, patch reference integrity measurement wrapper may be signed with a signature 452. In one or more embodiments, signature 452 may be a signature of updated reference integrity measurement element 434. For example, signature 452 may be an encrypted hash value of updated reference integrity measurement element 434. For instance, a hash value of updated reference integrity measurement element 434 may be encrypted with a private encryption key to produce signature 452. In one or more embodiments, a public encryption key associated with the private encryption key may be utilized to decrypt signature 452 to produce the hash value of updated reference integrity measurement element 434.

At 618, an update package may be built. For example, the update package may include a firmware update and patch reference integrity measurement wrapper 412. In one or more embodiments, patch reference integrity measurement wrapper 412 may include updated reference integrity measurement 434, patch reference integrity measurement identifier 442, and signature 452. At 620, the patch reference integrity measurement wrapper may be stored. For example, the OEM may store patch reference integrity measurement wrapper 412. For instance, patch reference integrity measurement wrapper 412 via a cloud storage system. As an example, patch reference integrity measurement wrapper 412 via OEM cloud solution 350.

At 622, the patch reference integrity measurement wrapper may be uploaded to a content delivery network (CDN). For example, the OEM may upload patch reference integrity measurement wrapper 412 to a CDN. For instance, OEM cloud solution 350 may include the CDN. At 624, the update package may be downloaded. For example, OEM agent 169 of IHS 110A may download the update package. For instance, OEM agent 169 of IHS 110A may download the update package from the CDN.

At 626, the update package may be installed. For example, OEM agent 169 of IHS 110A may install the update package. In one or more embodiments, installing the update package may include installing patch reference integrity measurement wrapper 412. For example, patch reference integrity measurement wrapper 412 may be installed as a file 163. For instance, data of patch reference integrity measurement wrapper 412 may be installed in a file of files 163A-163N. Although files 163A-163N are illustrated, non-volatile memory medium 160 of IHS 110A may include any number of files 163, according to one or more embodiments. For example, a new file 163 may be added to non-volatile memory medium 160 of IHS 110A for each update package that is installed. In one or more embodiments, a file 163 may be installed in a boot partition of non-volatile memory medium 160 of IHS 110A. For instance, the boot partition of non-volatile memory medium 160 of IHS 110A may be or may include an EFS partition. In one or more embodiments, the method illustrated in FIG. 6A may be utilized in creating reference integrity manifests for component firmware patches and in installing the reference integrity manifests for the component firmware patches along with the component firmware on an information handling system.

Figure 6B:
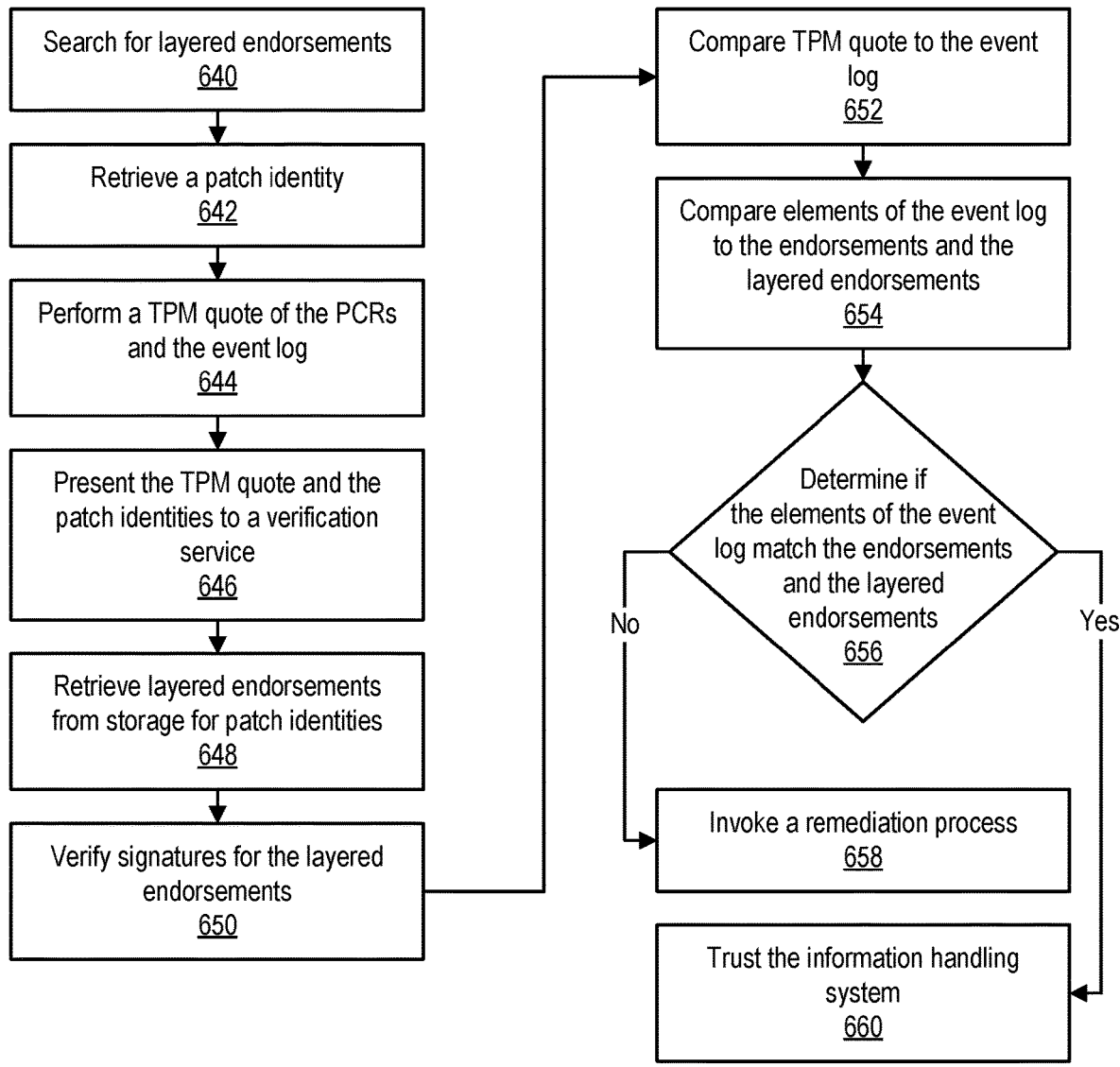
FIG. 6B illustrates another example of a method of operating a system, according to one or more embodiments.

Turning now to FIG. 6B, another example of a method of operating a system is illustrated, according to one or more embodiments. At 640, layered endorsements may be searched for. For example, OEM agent 169 of IHS 110A may search for layered endorsements stored in non-volatile memory medium 160 of IHS 110A. For instance, OEM agent 169 of IHS 110A may search a boot partition of non-volatile memory medium 160 of IHS 110A for layered endorsements. At 642, a patch identity may be retrieved. For example, OEM agent 169 of IHS 110A may retrieve a patch identity from non-volatile memory medium 160 of IHS 110A. For instance, OEM agent 169 of IHS 110A may retrieve a patch identity from the boot partition of non-volatile memory medium 160 of IHS 110A.

At 644, a TPM quote of the PCRs and the event log may be performed. For example, OEM agent 169 of IHS 110A may perform a TPM quote of the PCRs and the event log. At 646, the TPM quote and the patch identities may be presented to a verification service. For example, OEM agent 169 of IHS 110A may present the TPM quote and the patch identities to verification service 320. For instance, OEM agent 169 of IHS 110A may present the TPM quote and the patch identities to verification service 320 via network 310.

At 648, layered endorsements may be retrieved from storage for patch identification. For example, verification service 320 may retrieve layered endorsements from storage for patch identification. For instance, verification service 320 service may retrieve layered endorsements from storage to obtain patch identities for patch identification. At 650, signatures for the layered endorsements may be verified. For example, verification service 320 may verify signatures for the layered endorsements.

At 652, the TPM quote may be compared to the event log. For example, verification service 320 may compare the TPM quote to the event log. At 654, elements of the event log may be compared to the endorsements and the layered endorsements. For example, verification service 320 may compare elements of the event log to the endorsements and the layered endorsements. In one or more embodiments, the method illustrated in FIG. 6B may be utilized in verifying patch firmware measurements with patch firmware reference integrity manifests in an information handling system.

Figure 7:
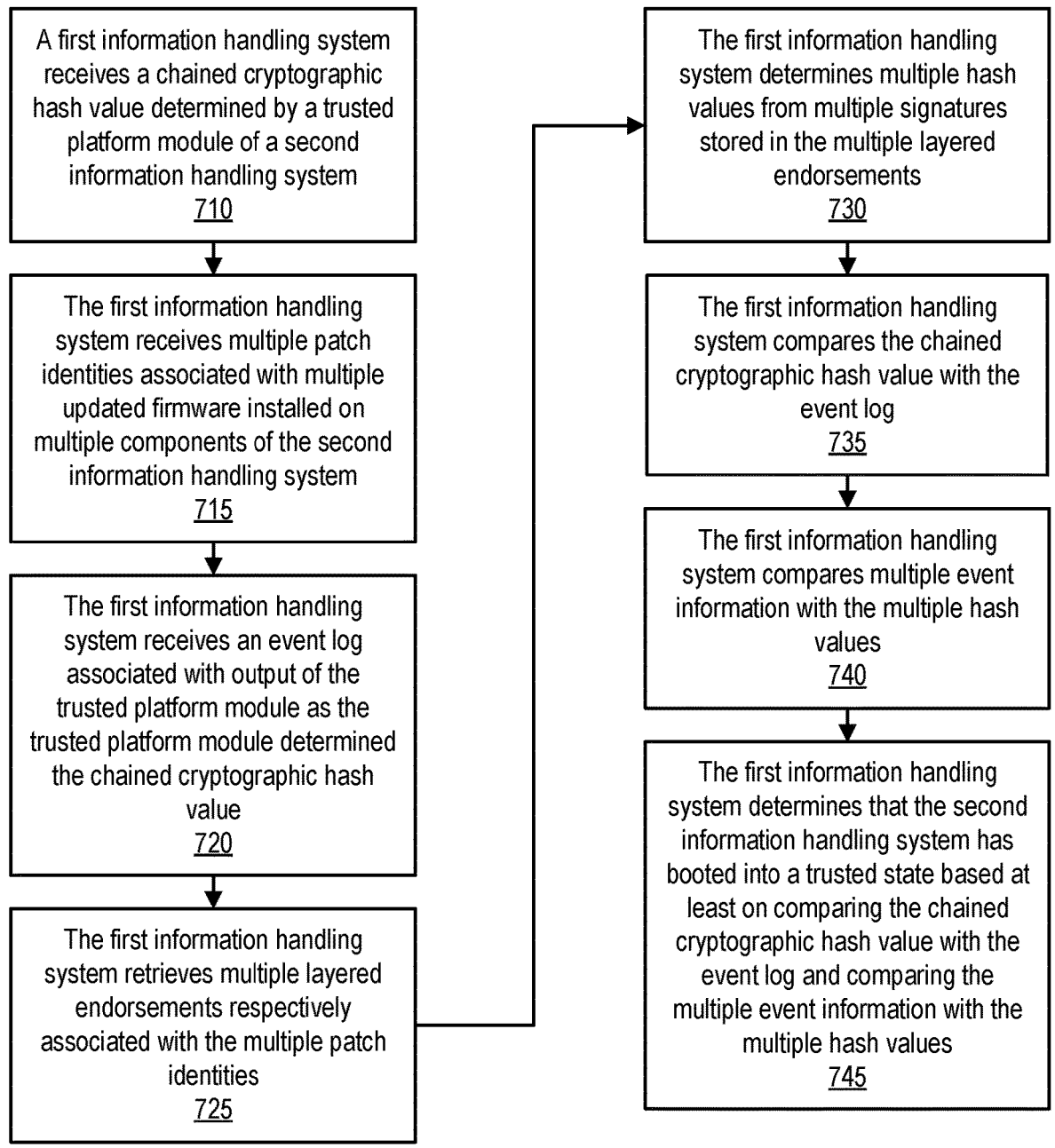
FIG. 7 illustrates an example of operating an information handling system, according to one or more embodiments.

Turning now to FIG. 7, an example of operating an information handling system is illustrated, according to one or more embodiments. At 710, a first information handling system may receive a chained cryptographic hash value determined by a trusted platform module of a second information handling system. For example, IHS 110B may receive a chained cryptographic hash value determined by TPM 140 of IHS 110A. At 715, the first information handling system may receive multiple patch identities associated with multiple updated firmware installed on multiple components of the second information handling system. For example, IHS 110B may receive multiple patch identities associated with multiple updated firmware installed on multiple components of IHS 110A.

At 720, the first information handling system may receive an event log associated with output of the trusted platform module as the trusted platform module determined the chained cryptographic hash value. For example, IHS 110B may receive an event log associated with output of TPM 140 of IHS 110A as TPM 140 of IHS 110A determined the chained cryptographic hash value. At 725, the first information handling system may retrieve multiple layered endorsements respectively associated with the multiple patch identities. For example, IHS 110B may retrieve multiple of layered endorsements 340A-340N respectively associated with the multiple patch identities.

At 730, the first information handling system may determine multiple hash values from multiple signatures stored in the multiple layered endorsements. For example, IHS 110B may determine multiple hash values from multiple signatures stored in the multiple of layered endorsements 340A-340N. At 735, the first information handling system may compare the chained cryptographic hash value with the event log. For example, 110B may compare the chained cryptographic hash value with the event log.

At 740, the first information handling system may compare multiple event information with the multiple hash values. For example, 110B may compare multiple event information with the multiple hash values. At 745, the first information handling system may determine that the second information handling system has booted into a trusted state based at least on the comparing the chained cryptographic hash value with the event log and the comparing the multiple event information with the multiple hash values. For example, IHS 110B may determine that IHS 110A has booted into a trusted state based at least on comparing the chained cryptographic hash value with the event log and comparing the multiple event information with the multiple hash values. In one or more embodiments, the method illustrated in FIG. 7 may be utilized in operating a system, in which the first information handling system may verify a trustworthiness of the second information handling system via validating integrity measurements associated with the second information handling system.

In one or more embodiments, one or more of the method elements, one or more the process elements, one or more portions of a method element, and/or one or more portions of a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computing environment, comprising:
   a first information handling system, comprising:
      at least one processor; and
      a memory medium, coupled to the at least one processor, that stores instructions executable by the at least one processor, which when executed by the at least one processor, cause the first information handling system to:
         receive a chained cryptographic hash value determined by a trusted platform module of a second information handling system;
         receive a plurality of patch identities associated with a plurality of updated firmware installed on a plurality of components of the second information handling system;
         receive an event log associated with output of the trusted platform module as the trusted platform module determined the chained cryptographic hash value;
         retrieve a plurality of layered endorsements respectively associated with the plurality of patch identities;
         determine a plurality of hash values from a plurality of signatures stored in the plurality of layered endorsements;
         compare the chained cryptographic hash value with the event log;
         compare a plurality of event information with the plurality of hash values; and
         determine that the second information handling system has booted into a trusted state based at least on comparing the chained cryptographic hash value with the event log and comparing the plurality of event information with the plurality of hash values;
   the second information handling system, comprising:
      at least one processor; and
      a memory medium, coupled to the at least one processor, that stores instructions executable by the at least one processor, which when executed by the at least one processor, cause the second information handling system to:
         determine, by the trusted platform module of the second information handling system, the chained cryptographic hash by:
            concatenating a previous hash value of a particular updated firmware of the plurality of updated firmware and a current hash value of the particular updated firmware of the plurality of updated firmware;
            determining a hash value of the concatenation as the chained cryptographic hash value;
   a third information handling system, comprising:
      at least one processor; and
      a memory medium, coupled to the at least one processor, that stores instructions executable by the at least one processor, which when executed by the at least one processor, cause the third information handling system to:
         obtain a plurality of endorsements from a plurality of respective third party component suppliers, each endorsement associated with a respective component of the plurality of components of the second information handling system;
aggregate the plurality of endorsements; and
store the aggregated plurality of endorsements at a memory medium of the third information handling system, the aggregated plurality of endorsements including the layered endorsements.

2. The computing environment of claim 1, wherein the instructions further cause the first information handling system to:
determine that the second information handling system has not booted into the trusted state based at least on comparing the chained cryptographic hash value with the event log and comparing the plurality of event information with the plurality of hash values; and
perform at least one remediation process on the second information handling system.

3. The computing environment of claim 2, wherein, to perform the at least one remediation process on the second information handling system, the instructions further cause the first information handling system to reinstall at least one of the plurality of updated firmware installed on the plurality of components of the second information handling system.

4. The computing environment of claim 1, wherein, to retrieve the plurality of layered endorsements respectively associated with the plurality of patch identities, the instructions further cause the first information handling system to retrieve the plurality of layered endorsements from a database.

5. The computing environment of claim 1, wherein each layered endorsement of the plurality of layered endorsements includes a signature of a reference integrity measurement associated with the firmware associated with the layered endorsement.

6. The computing environment of claim 5, wherein the signature of the reference integrity measurement includes an encrypted hash value of the reference integrity measurement.

7. The computing environment of claim 6, the reference integrity measurement is associated with updated firmware of the plurality of updated firmware.

8. The computing environment of claim 7, wherein at least one of the plurality of components of the second information handling system include a baseboard management controller, a volatile memory medium, a non-volatile memory medium, an I/O subsystem, a network interface, a touchpad controller, a liquid crystal display controller, a microcontroller, or an expansion card.

9. The computing environment of claim 8, wherein the expansion card includes a graphics card, a network card, a RAID (redundant array of inexpensive disks) card, a non-volatile memory medium card, a cryptography card, an audio processing card, a video processing card, an audio/video processing card, a physics processing card, an artificial intelligence card, a host adapter card, or a clock card.

10. A method, comprising:
receiving, by a first information handling system, a chained cryptographic hash value determined by a trusted platform module of a second information handling system;
receiving, by the first information handling system, a plurality of patch identities associated with a plurality of updated firmware installed on a plurality of components of the second information handling system;
receiving, by the first information handling system, an event log associated with output of the trusted platform module as the trusted platform module determined the chained cryptographic hash value;
retrieving, by the first information handling system, a plurality of layered endorsements respectively associated with the plurality of patch identities;
determining, by the first information handling system, a plurality of hash values from a plurality of signatures stored in the plurality of layered endorsements;
comparing, by the first information handling system, the chained cryptographic hash value with the event log;
comparing, by the first information handling system, a plurality of event information with the plurality of hash values;
determining, by the first information handling system, that the second information handling system has booted into a trusted state based at least on the comparing the chained cryptographic hash value with the event log and the comparing the plurality of event information with the plurality of hash values;
determining, by the trusted platform module of the second information handling system, the chained cryptographic hash by:
concatenating a previous hash value of a particular updated firmware of the plurality of updated firmware and a current hash value of the particular updated firmware of the plurality of updated firmware;
determining a hash value of the concatenation as the chained cryptographic hash value;
obtaining, by a third information handling system, a plurality of endorsements from a plurality of respective third party component suppliers, each endorsement associated with a respective component of the plurality of components of the second information handling system;
aggregating, by the third information handling system, the plurality of endorsements; and
storing, by the third information handling system, the aggregated plurality of endorsements at a memory medium of the third information handling system, the aggregated plurality of endorsements including the layered endorsements.

11. The method of claim 10, further comprising:
determining, by the first information handling system, that the second information handling system has not booted into the trusted state based at least on the comparing the chained cryptographic hash value with the event log and the comparing the plurality of event information with the plurality of hash values; and
performing at least one remediation process on the second information handling system.

12. The method of claim 11, wherein the performing the at least one remediation process on the second information handling system includes reinstalling at least one of the plurality of updated firmware installed on the plurality of components of the second information handling system.

13. The method of claim 10, wherein the retrieving the plurality of layered endorsements respectively associated with the plurality of patch identities includes retrieving the plurality of layered endorsements from a database.

14. The method of claim 10, wherein each layered endorsement of the plurality of layered endorsements includes a signature of a reference integrity measurement associated with the firmware associated with the layered endorsement.

15. The method of claim 14, wherein the signature of the reference integrity measurement includes an encrypted hash value of the reference integrity measurement.

16. The method of claim 15, the reference integrity measurement is associated with updated firmware of the plurality of updated firmware.

17. The method of claim 16, wherein at least one of the plurality of components of the second information handling system include a baseboard management controller, a volatile memory medium, a non-volatile memory medium, an I/O subsystem, a network interface, a touchpad controller, a liquid crystal display controller, a microcontroller, or an expansion card.

18. The method of claim 17, wherein the expansion card includes a graphics card, a network card, a RAID (redundant array of inexpensive disks) card, a non-volatile memory medium card, a cryptography card, an audio processing card, a video processing card, an audio/video processing card, a physics processing card, an artificial intelligence card, a host adapter card, or a clock card.

* * * * *